United States Patent [19]
Lubarsky, Jr. et al.

[11] 3,814,839
[45] June 4, 1974

[54] REMOTE DIGITAL SWITCHING TECHNIQUE FOR USE ON COMMUNICATIONS CIRCUITS

[75] Inventors: Andre Lubarsky, Jr., Sunnyvale; Richard E. Pospisil, Los Altos, both of Calif.

[73] Assignee: Telecommunications Technology, Inc., Sunnyvale, Calif.

[22] Filed: May 8, 1972

[21] Appl. No.: 251,353

[52] U.S. Cl. .......................... 178/2 C, 179/175.3 R
[51] Int. Cl. .......................... H04l 11/12
[58] Field of Search ......... 178/2 C, 2 D, 4.1 B, 2 R, 178/3, 4.1 R; 179/2 A, 6 E, 15 AL, 15 BA, 15 BY, 18 B, 175.2 R, 175.2 C, 175.3, 175.31 R, 4, 2 DP

[56] References Cited

UNITED STATES PATENTS

| | | | |
|---|---|---|---|
| 3,001,009 | 9/1961 | Light et al. | 178/2 R |
| 3,049,592 | 8/1962 | Waldman | 179/2 A |
| 3,062,913 | 11/1962 | Myrick | 178/2 R |
| 3,236,940 | 2/1966 | Chaskin | 178/4.1 R |
| 3,371,165 | 2/1968 | Earle et al. | 179/175.3 |
| 3,374,309 | 3/1968 | Elich et al. | 178/2 |
| 3,508,003 | 4/1970 | Moyers | 179/2 A |
| 3,529,089 | 9/1970 | Davis et al. | 179/15 AL |
| 3,531,772 | 9/1970 | Dalyai et al. | 340/163 |
| 3,560,670 | 2/1971 | Heyes et al. | 179/175.31 |
| 3,634,627 | 1/1972 | Velentini | 179/15 BA |
| 3,689,703 | 9/1972 | Allen et al. | 179/18 B |
| 3,692,964 | 9/1972 | Camiciottoli et al. | 179/175.31 R |
| 3,697,959 | 10/1972 | Abramson et al. | 340/172.5 |
| 3,699,254 | 10/1972 | Nailen | 178/66 R |
| 3,719,890 | 3/1973 | Borciani et al. | 325/55 |

*Primary Examiner*—Thomas W. Brown
*Attorney, Agent, or Firm*—Limbach, Limbach & Sutton

[57] ABSTRACT

A plurality of remote switching modules are positioned along a telephone communication circuit and are responsive to signals sent by a control unit along the same circuit. The control unit signal includes a plurality of bursts of bipolar digital pulses having a certain format with timed spaces between each burst of pulses. Each remote module counts the pulses received from the control unit through the communications circuit. One of the modules responds when addressed with a burst of pulses of a number for which the module has been uniquely programmed. When a given module has been addressed, another burst of pulses tells the addressed module what switching function to perform.

17 Claims, 6 Drawing Figures

REMOTE DIGITAL SWITCHING TECHNIQUE FOR USE ON COMMUNICATIONS CIRCUITS

CROSS-REFERENCE TO A RELATED APPLICATION

This application is related to a co-pending application of Andre Lubarsky, Jr. and G. Scott Warner, entitled, "Remote Digital Switching Technique for Use on Communications Circuits" and assigned Ser. No. 251,354, filed May 8, 1972.

BACKGROUND OF THE INVENTION

This invention relates generally to the art of electronic switching and, more specifically, to the art of performing switching at one location along a communication circuit from another location therealong.

Private telephone lines of the type leased from established telephone companies are becoming increasingly popular. Such a private line is often leased by a business from the telephone company to connect two or more geographical locations with a continuously available communication circuit therebetween. If there is trouble in the private line and it cannot be located between central offices, then a technician must travel to one of the customer terminals at an end of the line to send or receive a test tone. This technique of testing involves a large amount of technician time, ties up other communications circuits for the technicians to talk to each other from the ends of various segments of the line and additionally requires longer time to conduct the test which means that a private line is out of service for a significant length of time.

It has been suggested that remotely controlled test units be positioned along a private line and be commanded from the controlling central office or another central office along the line to perform certain testing functions. However, the techniques that have been suggested for implementing such a remote testing approach have suffered from certain disadvantages. These techniques require a large amount of expensive electronic equipment or are limited in information and functions they can provide. Also, the reliability of control of the remote testing units has not been as high as desired because of shortcomings of present techniques. One such technique is the sending of distinct tones to address and command remote action. Another technique is d.c. signaling to remote locations.

Therefore, it is a primary object of the present invention to provide a remotely controlled system for testing telephone lines that is simple, versatile, inexpensive and expandable.

It is a more general object of the present invention to provide a method and system for remote signaling to effect switching along a communications circuit for a variety of reasons.

It is another object of the present invention to provide a communication circuit signaling technique that is useful on most types of existing voice circuits without having to make any special accommodation in the technique or equipment for each different type of communication circuit to which it may be applied.

It is yet another object of the present invention to provide a remote controlling technique that results in operation of a desired remote module along a communication circuit in response to a coded address signal for that particular module without making the unit operable from the normal supervisory signals, information signals, etc, that are transmitted along the telephone line.

SUMMARY OF THE INVENTION

Briefly, these and additional objects are accomplished by the present invention wherein a remote switching unit is controlled by bursts of pulses sent as a signal along a communication circuit to the unit. The information being conveyed to the unit is in the number of pulses in each burst. This simplifies the unit circuitry a great deal. A given communication circuit may include a plurality of individually addressable switching units or modules. Each of the remote modules along a circuit counts the number of pulses in each burst and acts in a pre-programmed manner according to the count. As an aid in discriminating bursts of pulses intended for the modules from other signals or noise on the communication circuit, the remote modules develop a signal when a burst has ended. This signal is necessary before a remote module changes its state in any way. One burst of pulses from the control unit selects a desired module to be made operable and a subsequent burst of pulses instructs the selected module as to the switching function it is to perform.

In a preferred form of a digital signal for controlling one or more remote modules along a communication line, a first burst of a plurality of pulses is desired as an activator for those types of communication circuits that have a gain that depends on the magnitude of the signal. The first burst conditions a circuit of this type and for other types of circuits it has no effect. A second burst has a number of pulses corresponding to the address of the remote module to be made operable. A third burst has a number of pulses which instructs the addressed remote module to perform the desired function. A fourth burst of pulses is the same as the second burst, the address of the desired remote module. Upon receipt of the second address (the fourth burst), the addressed remote module performs the instructed switching function. Two address bursts are desirable to improve the immunity to false triggering of the remote unit.

Each of the remot modules contains a binary counter which is incremented in response to the pulses sent into the communication circuit. A comparator circuit monitors the count of the counter and emits a mismatch signal when its count is something other than the binary address code number which is uniquely set for each module. This mismatch signal is utilized in a manner to reduce the possibility of false signaling from noise, data signals or other signals on the communication line. When the counter is at a number that matches the preset address code, the output of the comparator circuit is a match signal. Logic circuits respond to the detection of a space which occurs at the end of each burst of pulses and read the output of the comparator circuit. If at the end of the first address burst the comparator output is a matched signal, the logic circuitry will act upon the next burst of pulses. This next burst of pulses representing the function increments the counter and this incrementation is stored. The counter incrementation during the function burst is a code for the function that the module is commanded to perform. A second address burst of pulses following the function burst of pulses causes the coded function to be executed and the predetermined switching is accomplished.

The techniques of the present invention have wide application for remote switching. One of these applications is for testing the very communication line which is carrying the burst of pulses from a control unit to the various remote modules. One of the switching functions of a remote testing module can be the generation of a test tone to be sent back to the location of the communication line where the control unit is stationed. In this manner, a single technician can test a telephone line or other communication circuit from a single location by sequentially addressing a plurality of modules remotely stationed at different places along the communication line, thereby allowing the trouble section of the line to be identified. Another function that the module may perform in testing the communication line is the standard loop-back-measurement which ties the transmission line from the control center back to the reception line at the remote location so that a single technician may insert his own test tone which is looped back for measurement by him. The communication circuit can be looped back at each of the several locations, one at a time, where a remote module is installed and thus allows trouble sectionalization. Yet another possible function is to remotely disconnect or bypass a trouble section of the line, once that section has been identified, so the remianing portions of the line may continue operating.

Such telephone line testing is only one of many applications for the digital signaling and switching techniques of the present invention. These techniques can be used to control anything requiring switching. The digital signal can be sent along established communication circuits or along special circuits and lines. Remote reading of electric and gas meters is another application wherein a remote module would be located at each meter. Each module is addressable from a central location and may be remotely commanded to send back along a communication line the reading of the meter. The low cost of the remote modules makes such meter reading an economical operation.

Yet another application is for telephone central office switching generally. For example, various switching functions of an unmanned central office may be controlled from a manned central office. The switching capability at a remote location can be easily expanded as required while presently used remote switching techniques require a very large initial investment in equipment in order to provide for future demands.

It is the communication circuit testing application of the more general remote switching techniques of the present invention that is described in the following discussion which is to be taken in conjunction with the accompanying drawings.

DESCRIPTION OF THE PREFERRED EMBODIMENTS

Figure 1:
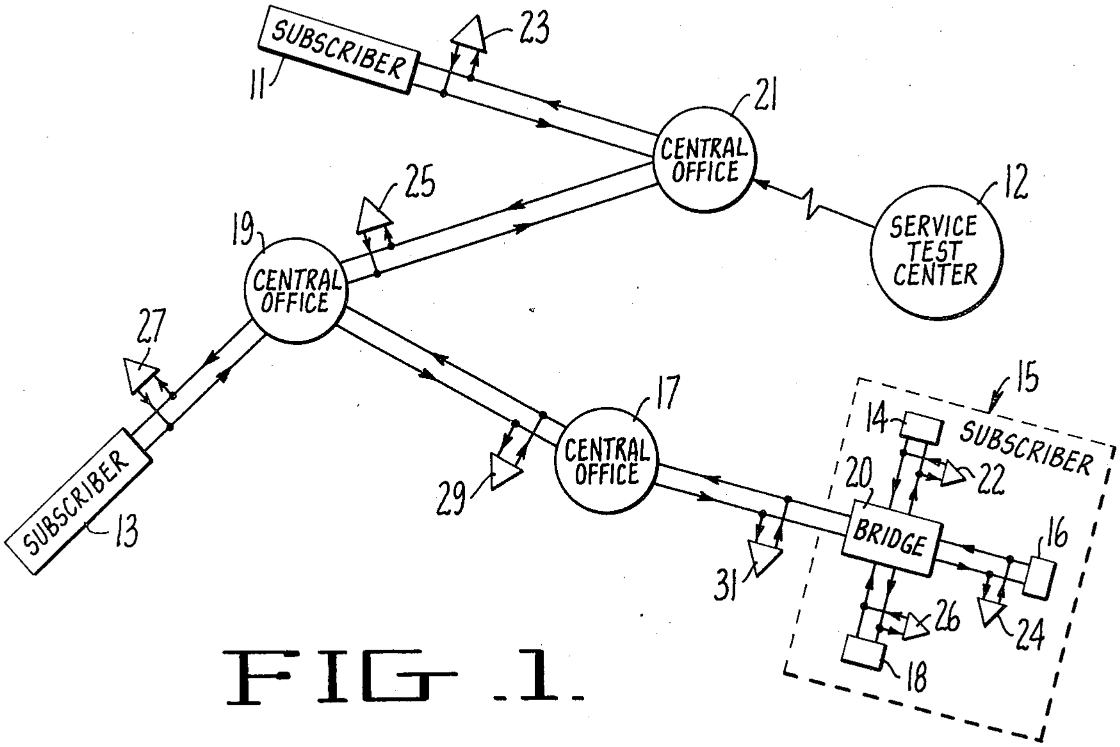
FIG. 1 schematically illustrates a private line telephone system wherein the remote signaling and switching operations of the present invention may be utilized.

FIG. 1 illustrates in a very simplified form an example of a private communication line linking three subscriber locations 11, 13, and 15. The private line joins these three locations through three central offices 17, 19, and 21. A service test center 12 within the telephone system is capable of inserting signals into the private line for testing purposes. Remote testing modules 23, 25, 27, 29, and 31 are provided at various locations along the private line so that any trouble or potential trouble may be localized by testing from the service test center 12. The subscriber location 15 is shown in FIG. 1 to include three communications terminals 14, 16, and 18 connected to the telephone line through a bridge 20. Adjacent each of the terminals 14, 16 and 18 is one of remote modules 22, 24 and 26, respectively, for permitting testing of the line right up to each subscriber terminal. The modules 22, 24 and 26 are signalled from the service test center 12 and may be programmed to disconnect their associated communication terminals when a malfunction thereof effects other terminals at the subscriber location 15. The remaining terminals can then be operated until a technician can travel to the subscriber's location and repair the malfunctioning terminal.

Each of the remote modules may be operated one at a time from the service test center 12. A different portion of the private line is tested each time a different remote module is switched into operation. For example, a technician at the service test center 12 may send out a train of signaling pulses which includes a burst of pulses to the remote module 25 followed by a burst of pulses to select a pre-programmed switching function that the module is to perform. Such a switching function may be, for instance, the tying the the transmission line from the service test center 12 into the return receive line. When this is accomplished, the technician at the service test center 12 can then pass a test signal down the communication line to the remote testing module 25 and back again through the private communication line to the service test center 12. If this test signal is transmitted and received properly, then the remote test module 25 may be removed from the line and the next remote module 29 may be switched to examine a longer portion of the circuit. If a test tone is transmitted to and received satisfactorily from the remote module 29, then it may be taken off the line and again a more distant module 31 may be operated. An actual private line will probably be more complicated than that shown in FIG. 1, of course, but the same principles and testing techniques may be used.

Figure 2:
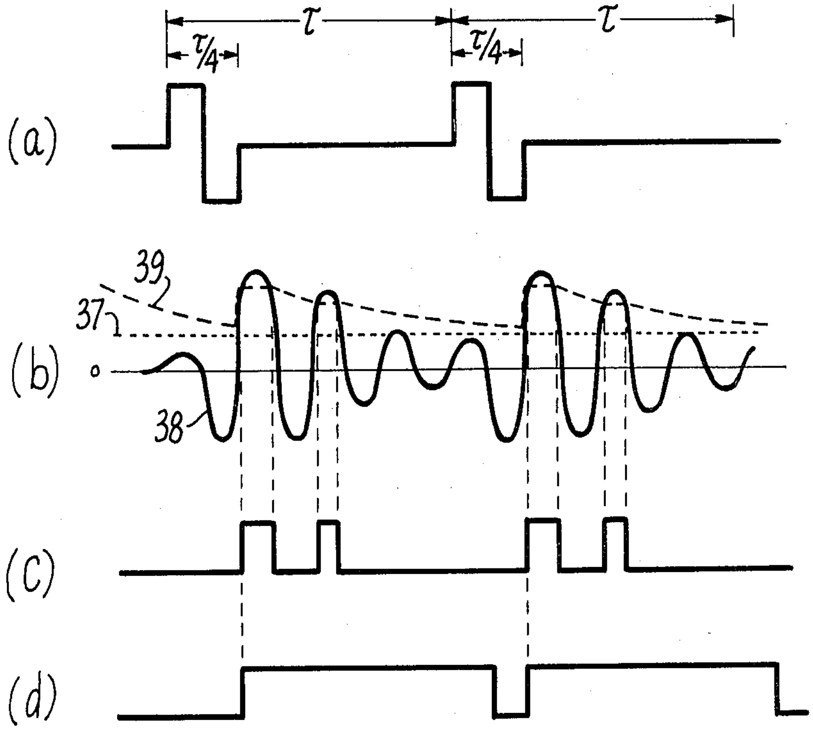
FIG. 2 illustrates the basic pulse pattern for remote signaling and a type of distortion of a communication circuit on such signaling pulses.

FIG. 2(*a*) illustrates the preferred form of pulses that are generated in some convenient manner and sent down the communication line to selectively activate the remote modules. Squarewave pulses 33 and 35 of FIG. 2(*a*) are exemplary of the type of pulses which are inserted into a communication circuit. Other pulse shapes such as sine waves may be alternatively employed. The pulses are not immediately repeated but rather spaced apart a certain time. The pulses are repeated with a period $\tau$. At the beginning of one pulse repetition period $\tau$, the squarewave pulse 33 occurs which itself has a period substantially less than that of $\tau$, shown in FIG. 2(*a*) to be ¼ $\tau$. At the end of the pulse repetition period $\tau$ in which the pulse 33 occurs, a second squarewave pulse 35 occurs at the beginning of a second pulse repetition period that is also $\tau$ in length.

The pulses themselves, such as pulses 33 and 35 of FIG. 2(*a*), complete a full cycle at a rate that is within the frequency spectrum of a normal telephone line, usually 300–3,000 Hz. A convenient frequency of the pulses themselves is around 1,000 Hz. or some other frequency in the center of the band. That is, the period of the pulses themselves ($\tau/4$) are at a 1,000 Hz. rate, or each pulse is equal to about one millisecond in duration. The pulse repetition period $\tau$ is thus four times this amount, or about four milliseconds. Each one millisecond pulse is followed by a three millisecond pause, all within a single pulse repetition period $\tau$. If the remote signaling techniques of the present invention are employed along a communications circuit other than a telephone line, the pulse frequency will, of course, be conformed to the response of that circuit.

Each of the pulses, such as pulses 33 and 35 of FIG. 2(*a*), are bipolar in nature. That is, the pulses have both a positive going and a negative going portion for each cycle. In this manner, no d.c. bias is introduced into the communication line as a result of sending the pulses therethrough.

FIG. 2(*b*) shows in an exaggerated form the waveform at the end of a communication circuit resulting from the pulses of FIG. 2(*a*) being applied to its input. Available communication lines grossly distort such pulses in a manner indicated in FIG. 2(*b*). The characteristics of telephone lines that cause such a distortion are well known, and include bandwidth restrictions and envelope delay. The output waveform is not a clean pulse but rather a decaying alternating waveform. The techniques of the present invention count the number of pulses sent down the communications circuit rather than looking at the output thereof for a waveofrm of a similar shape to that applied to the input of the communications circuit. A minimum threshold level, such as the level 37 shown in FIG. 2(*b*), is established in each of the remote modules connected to the communications circuit and the pulses sent therethrough are counted by noting when the signal at the output of the circuit exceeds such a threshold level. The threshold level 37 is preferably made low with respect to the normal signal level in the communications circuit so that pulses sent therethrough will be detected by the remote modules even though the signal level at the circuit input is seriously degraded by a malfunction to be diagnosed by the use of the modules. The threshold level 37 is made low for the additional reason that it is desirable to keep the threshold level removed from the amplitude modulated carrier variations characteristic of certain types of signals that may be sent along the communications circuit, thus preventing false keying of the modules by the carrier as its amplitude rises and falls around the threshold level.

It will be noted that the distorted output signal of FIG. 2(*b*) rises and falls above the threshold level 37 more than one time for each of the pulses 33 and 35 of FIG. 2(*a*) that are applied to the input of the communication circuit. This results from the desirability for the reasons expressed above of making the threshold level 37 a very low one. The testing technique and module circuitry are designed to assure that each of the pulses 33 and 35 is counted only once by a remote module, as will become apparent hereinafter. One factor which reduces the possibility of counting a single pulse twice at a remote module is the spacing of the pulses as shown in FIG. 2(*a*) rather than repeating the pulses 33 and 35 without any pause or space therebetween. The space between pulses allows the output variations from one pulse to die down to a level below a threshold detection level before a second pulse is sent. Other factors which reduce the possibility of counting a single input pulse cycle twice at a remote module include the use of a variable threshold 39 (FIG. 2(*b*)) and the use of a pulse generator (a one shot) at the input of each module, as described hereinafter.

Figure 3:
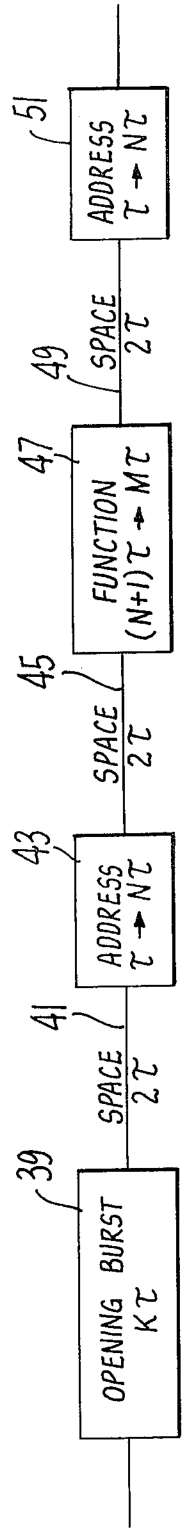
FIG. 3 illustrates a configuration of signaling pulses that are sent down a communication circuit for performing a remote switching function.

Referring to FIG. 3, a preferred form of pulses for addressing and commanding a particular remote module is described generally. The pulses are formed into four separate bursts. An opening burst 39 serves no function in addressing or commanding a remote module but is designed to open up a telephone line of the type that utilizes companders. The opening burst 39 contains K number of pulses, each pulse of the form illustrated in FIG. 2(*a*).

After the opening burst 39, a space or pause 41 is provided for activating the remote modules in a manner described hereinafter. Spaces are provided between the separate bursts of pulses so that the remote modules can detect the beginning and ending of each burst. The space between bursts of pulses is conveniently $2\tau$, a minimum pause that permits detection of the end of a burst of pulses. The space duration is minimized for speed of access to a remote module. The remote modules on a given communication circuit all count the number of pulses in each burst.

A given module acts when a certain predetermined number of counts unique to that particular module is detected. A second burst 43 contains a number of pulses of the type illustrated in FIG. 2(*a*) corresponding to the pre-programmed address in one of the remote modules attached to a communications circuit. The number of pulse repetition periods $\tau$ that are included in the address burst 43 depends on which of the remote modules to be addressed. The number of periods $\tau$ preferably ranges between $\tau$ and $N\tau$, where N is the maximum number of addresses.

A space 45 having a duration of $2\tau$ follows the address burst 43. Following this space is a third burst of pulses 47 which commands the addressed module as to the function it is to perform. The number of pulse repetition periods of the function burst 47 preferably ranges from $(N + 1)\,\tau$ to $M\tau$, where M is the total number of codes possible and M is greater than N.

Another space 49 follows the function burst of pulses and is again preferably $2\tau$ in duration. Following the space 49 is an address burst 51 that has the same number of pulse repetition periods as the first address burst 43. The purpose of the second address burst 51 is to command the previously addressed remote module to perform the function for which is has been programmed by the function burst 47. The use of the second address burst 51 improves immunity to false keying of the remote module by ordinary communication data that is sent over the communication line. At the end of the second address burst 51, the addressed remote module begins performing its commanded function and will continue to do so until similar bursts of pulses are sent through the communication circuit to tell that remote module to perform a different function. One of the programmed functions is to restore the module to its inactive condition.

In the remote module described hereinafter, a central element is a binary counter that is incremented one count for each pulse detected in the communication circuit. In the system described herein, a four bit counter is utilized, thus limiting the maximum number of pulses for any one burst to 16 which is the maximum count of the counter. Thus the "M" of FIG. 3 is 15 when such a counter is used. The quantity "N" indicated in FIG. 3 is made to be 11 for the very specific example being described herein. Thus, the address burst of pulses will include from one to 11 pulses depending on which of the remote modules on a communications circuit is being addressed. The function burst of pulses will include 12, 13, 14 or 15 pulses depending on which of four pre-programmed functions the addressed remote module is commanded to execute. The quantity "K" of FIG. 3, which is the number of pulses in the opening burst 39, is made to be some number outside of the range reserved for the address burst of pulses so that the opening burst does not address a remote module. For the four bit counter and the "N" and "M" quantities described above, "K" may conveniently be 14.

Figure 4:
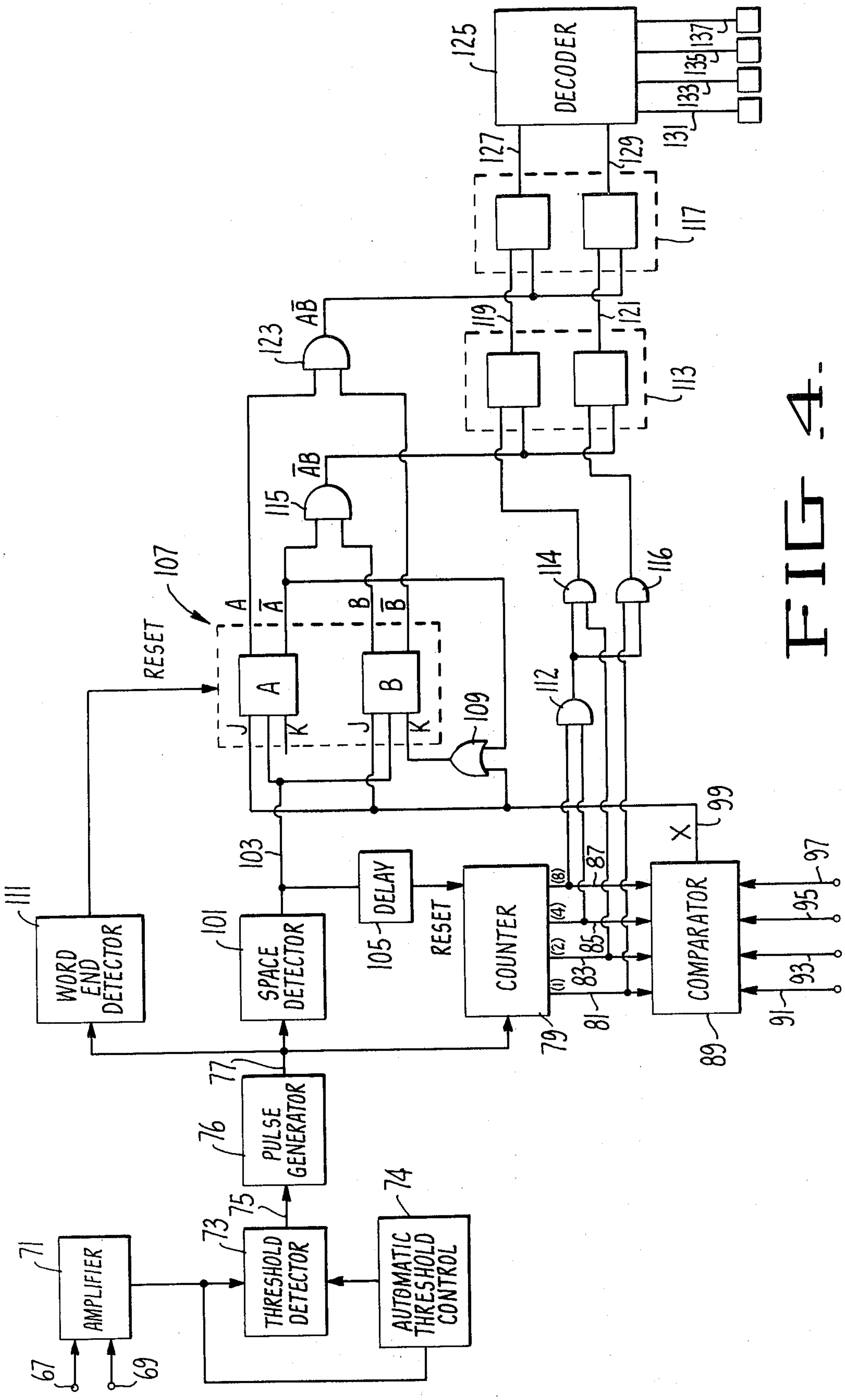
FIG. 4 is a schematic diagram of the component parts of a remote module for switching in response to a train of signaling pulses.

Referring to FIG. 4, a preferred remote module is described in detail. The communications circuit, such as a private commercial telephone line, is connected to input terminals 67 and 69. These terminals are connected to an input of a balanced amplifier 71 which isolates the remote module from the communications circuit by presenting a high impedance thereto. The output of the balanced amplifier 71 is applied to a threshold detector 73 that emits a pulse in its output line 75 each time the output of the amplifier 71 exceeds the threshold voltage level with which the detector 73 is making a comparison. The threshold detector 74 is preferably of a type providing noise immunity by including an hysteresis feature.

An automatic threshold control 74 is additionally provided that responds to the output of the amplifier 71 in a manner to raise the threshold level of the detector 73 when the signal level at the output of the amplifier 71 increases to a high level. This can be accomplished by any convenient circuit, such as one including a capacitor storage device that monitors the average signal level at the output of the amplifier 71 and which causes the threshold level of the threshold detector 73 to increase with the increased voltage across the storage capacitor.

A storage capacitor within the automatic threshold control circuit 74 may be, as a specific example, charged through a diode to the voltage at the output of the amplifier 71. The combination of a short charge time constant and a long discharge time constant of the storage capacitor circuit provides a threshold variation as illustrated by the dashed curve 39 of FIG. 2(*b*). A pulse received by a remote module and amplified by the amplifier 71 (FIG. 4) drives up the threshold very quickly, as shown in FIG. 2(*b*). The signal 38 is an amplified version of the signal received from the telephone line in response to pulses at a remote location. A slow decay time of the threshold level 39 results in maintaining the threshold at a level higher than the signal 38 just before a new pulse is received. This prevents incrementing the module counter at times other than when a pulse 33 or 35 is received and thus aids in detecting the number of pulses in a burst. A threshold level 37 of FIG. 2(*b*) is a minimum that is established.

Figure 6:
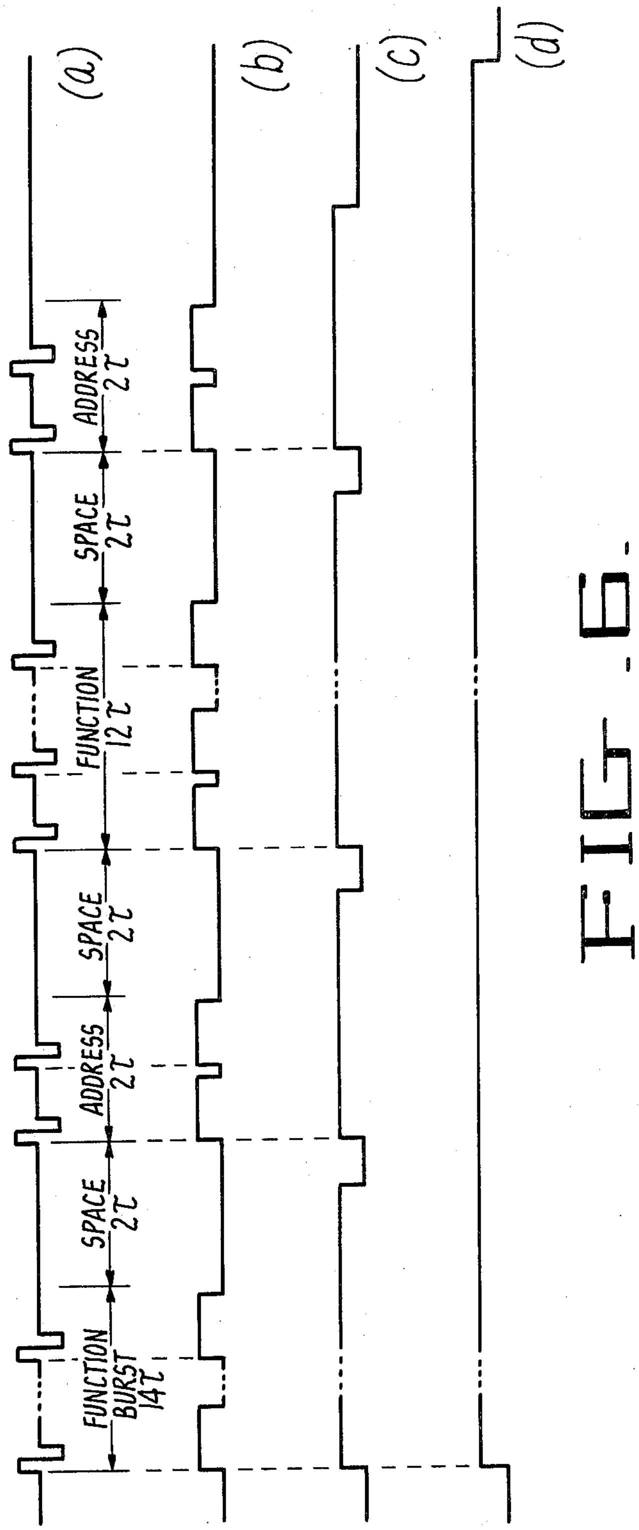
FIG. 6 illustrates voltage waveforms at several places of the remote module circuit of FIG. 4.

FIG. 2(*c*) shows the resulting output of the threshold detector in the line 75. As shown, there can be more than one pulse in the line 75 for each distorted pulse received from the communications circuit, one pulse each time the received pulse signal 38 of FIG. 2(*b*) exceeds the threshold 39. The number of pulses in the line 75 for each input pulse is likely to vary significantly and, therefore, a count of these pulses is really of no interest. Therefore, a pulse generator 76 is provided to emit a single pulse at its output line 77 for a single squarewave pulse input to the communication line. The pulse generator 76 is most conveniently a one-shot multivibrator that emits a single polarity square wave pulse at its output 77 in response to the rising edge of a pulse in the line 75, as shown in FIG. 2(*d*). The automatic threshold control circuit 74 of FIG. 4 assures that no additional pulses in the line 75 are occurring after the end of the pulse in the line 77 even though the signal 38 of FIG. 2(*b*) may exceed the minimum threshold level 37 of FIG. 2(*b*). This is accomplished by maintaining the threshold level 39 above the signal 38 at the falling edge of the pulse in the line 77. The output of the pulse generator 76 is set to have a duration slightly less then $\tau$ so that each pulse in the line 77 ends prior to receipt from the communication line of a subsequent squarewave pulse signal. The output of the pulse generator 76 in its line 77 is additionally illustrated in FIG. 6(*b*) for a particular pulse train applied to a communications circuit as shown in FIG. 6(*a*).

A primary operating element of the remote module of FIG. 4 is a counter 79 which is incremented one count for each pulse in the line 77. A commercially available four bit binary counter SN 7493 from Texas Instruments, or its equivalent, may be used. Four output lines 81, 83, 85 and 87 of the counter 79 represent, respectively, the (1), (2), (4) and (8) binary positions and are all connected with a comparator 89. The comparator may include commercially available circuits SN 7486 and SN 7405 from Texas Instruments, or their equivalents. The comparator 89 monitors the count of the counter 79 through its output lines 81–87 and compares this count with the fixed count that is applied to the comparator through a set of four lines 91, 93, 95 and 97. The fixed count applied to the comparator is the address of the remote module and is made to be unique for each module used on a single communication line. The address code may conveniently be set for a given module by grounding the appropriate lead or leads 91–97.

When the counter 79 is incremented by the input pulses at the line 77 to a count at its output lines 81–87 that matches the preset address at the lines 91–97, the signal level at an output line 99 ($x$) of the comparator is changed from a mismatched signal to a matched signal. When the counter 79 is incremented to its matched condition by an address burst of pulses in the communication line of the proper number, a match signal level is attained in the line 99 which places the circuit in condition for receiving a function burst of pulses in order to carry out a selected function.

Before the circuit of FIG. 4 is allowed to switch into the state required for carrying out the necessary function, however, it must also receive a signal which tells it that the burst of pulses is over. Otherwise, the circuit would react to the counter passing the count at which a given module is programmed even though it might go on to a higher count at the end of an address burst of pulses. Therefore, a space detector 101 is provided which receives the pulses from the line 77 and generates a signal in its output line 103 each time a space between bursts occurs. Such a space, for instance, is the space 45 of FIG. 3 between an address burst 43 and a function burst 47 of pulses.

The space detector 101 is a retriggerable one-shot multivibrator, or equivalent, that is set to have an output pulse of a duration slightly greater than the period $\tau$ of repetition of bi-polar pulses being sent along the communication line. The one-shot for the space detector 101 is keyed on the leading edge of each pulse in the line 77. Its output at the line 103 is shown in FIG. 6(*c*) for the particular pulse configuration of FIG. 6(*a*). The one-shot of the space detector 101 remains in a triggered condition so long as a burst of pulses is occurring since it is repetitively fired by the leading edge of each pulse in a burst before its output triggered by the previous pulse comes to an end. However, a sufficient space at the end of a burst of pulses will cause its output to eventually fall to the untriggered state prior to receipt of the next burst of pulses. The one-shot for the space detector 101 is preferably caused to have an output pulse duration of approximately $3/2\tau$ when the circuit is being used with the code of FIG. 2. When the one-shot of the space detector 101 returns to its unfired state, the output signal at 103 changes and causes the rest of the module circuit to change in state, depending on whether a proper match or mismatch signal simultaneously occurs in the line 99 at the output of the comparator 81. The space detector 101 may be, as a specific example, a commercially available one-shot, SN 74122 manufactured by Texas Instruments, or its equivalent.

The space signal in the line 103 that is generated between bursts of pulses is also used to reset the counter 79 back to a zero count after a short delay. A delay circuit 105 interposed between the line 103 and the counter 79 provides this delay and may be a commercially available circuit SN 7404 manufactured by Texas Instruments, or its equivalent.

A state flip-flop circuit 107 receives the space signal from the line 103 and a match or mismatch signal x in the line 99 to operate the remaining portions of the circuit of FIG. 4. The circuit 107 includes two flip-flops, denoted as A and B, of the J-K type. Each of these flip-flops is triggered by a space signal in the line 103 that denotes occurence of a space between bursts of pulses. The circuit 107 has four output lines, A and $\overline{A}$ outputs from the A flip-flop and B and $\overline{B}$ outputs from the B flip-flop. Thus, the circuit 107 has four possible output conditions. Each of the A and B flip-flops has J and K inputs.

The J inputs of each of the A and B flip-flops are connected solely with the comparator output line 99. The K input of the A flip-flop is unconnected. The K input of the B flip-flop is connected through OR gate 109 to the comparator output line 99 and $\overline{A}$ output of the A flip-flop. The logic equations for the inputs to the A and B flip-flops of the particular circuit 107 illustrated in FIG. 4 may be expressed as follows:

$J_A = x$ $K_A = 1$ $J_B = x$ $K_B = x + \overline{A}$

The state flip-flop circuit 107 is reset at the end of each binary word. That is, in the pulse sequence of FIG. 3, the flip-flops A and B of the circuit 107 are reset after a short delay following completion of the second address burst 51. This is accomplished by a word end detector 111 which is a one-shot multivibrator, or equivalent, that is triggered on the leading edge of the pulses in the input line 77. The same type of one-shot may be used here as was used for the space detector 101 except that the one-shot for the word end detector 111 is set to have an output pulse which lasts for a time equal to several periods $\tau$ of the communicating pulses that are transmitted through the communication lines. The pulse duration of the one-shot used for the word end detector 111 must be sufficient so that its output level does not drop back to an untriggered level during the spaces between bursts, such as spaces 41, 45 and 49 of the pulse pattern of FIG. 3, but only develops a reset pulse by dropping its output level back to its untriggered state after there has not been an input pulse in the line 77 for about three and one-half pulse repetition periods $\tau$. The output of the word end detector 111 is illustrated in FIG. 6(*d*) for the pulse train of FIG. 6(*a*).

Figure 5:
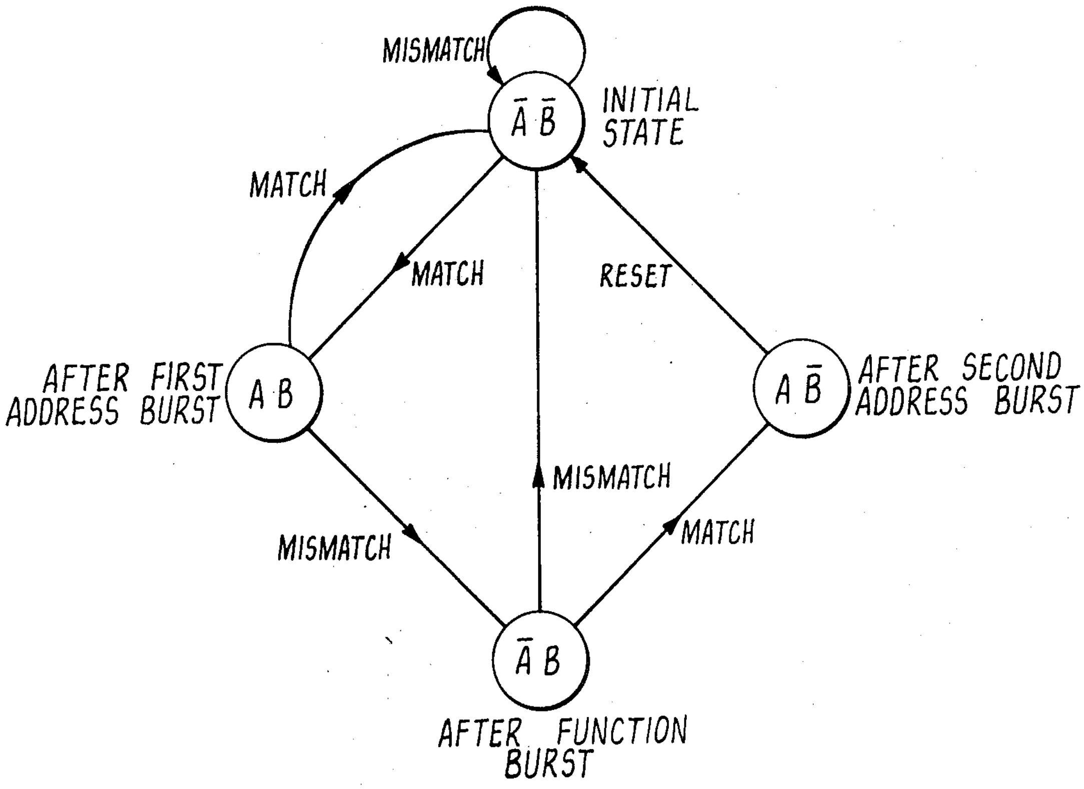
FIG. 5 is a logic state diagram of an element of the remote module of FIG. 4.

Operation of the J-K flip-flop circuit 107 between its four states is illustrated by the logic state diagram of FIG. 5. This particular logic state diagram is preferred but of course may be altered by changing the connections to the J and K inputs to the A and B flip-flops of the circuit 107 to perform slightly different functions. The initial state of the circuit is $\overline{A}\,\overline{B}$. The circuit will stay in that state until triggered by a space signal in the line 103 simultaneously with there being a match signal $x$ in the line 99. This is when the proper address burst has been received for the unit. The second state of the circuit 107 is then AB.

The circuit 107 switches to its third state $\overline{A}B$ only if a mismatch signal $x$ occurs simultaneously with the space trigger signal in the line 103. This occurs when a function burst of pulses is received after the address burst. Therefore, the number of pulses in a function burst must not be the same as the number of pulses in the address burst. If a match occurs while the circuit 107 is in its second state AB, the circuit returns to its initial $\overline{A}\,\overline{B}$ state. This aids in reducing the chances of falsely keying a module.

When in the third state $\overline{A}B$, the circuit 107 is switched to its fourth state $A\overline{B}$ by a match signal $x$ in the line 99 that occurs simultaneously with a space pulse in the line 103. This corresponds to the second address burst 51 being received by the module. The state flip-flop circuit 107 is reset to its AB state from the $A\overline{B}$ state by the word end detector 111.

Returning specifically to FIG. 4, the circuit elements directly controlling the function that the remote module performs are described. A preliminary function decoding AND gate 112 has its two input lines connected to the output lines 85 and 87 of the counter 79. The AND gate 112 emits a signal, therefore, when the (4)

and (8) bit position output of the counter 79 are both 1's. The output of the AND gate 112 is connected to one input each of gating AND gates 114 and 116. The other inputs of each of the AND gates 114 and 116 are connected respectively to the output lines 81 and 83 of the counter 79. Thus, the outputs of the AND gates 114 and 116 correspond to the counter state in its lines 81 and 83. The binary state of the two lines 81 and 83 determine which of the four elected functions the remote module is to perform but these functions are performed only if the lines 85 and 87 contain a binary 1. This corresponds to a count in the four output lines of the counter 79 of 12, 13, 14, or 15. The use of all four bits of the counter 79 for controlling the function command, even though only two lines are necessary for selecting one of four functions, further reduces the possibility of false keying. The counter 79 must be incremented to a high number before a module will perform a function. Therefore, the possibility is low that noise or data in a communication line will falsely key the circuit.

A temporary storage circuit 113 includes two D-type flip-flops, an input of one flip-flop connected with the output of the AND gate 116 and an input of the other flip-flops connected with the output of the AND gate 114. The other of the two inputs of each flip-flop of 113 receives a signal from the circuit 107 when it is in its third state of $\overline{A}B$. The $\overline{A}B$ signal is at the output of an AND gate 115 having its inputs connected respectively to the $\overline{A}$ and B outputs of the circuit 107. In operation, when the state flip-flop circuit 107 switches into its third state $\overline{A}B$, and the lines 85 and 87 of the counter 79 are in their binary "1" state, the count in the counter 79 as expressed in its first two output lines 81 and 83 is then stored in the temporary storage circuit 113. This occurs after the function burst of pulses is received and the count that is then stored in the temporary storage circuit 113 is indicative of the function that is being remotely commanded of the module to perform.

A permanent storage circuit 117 receives the stored count in the temporary storage circuit 113 by its output lines 119 and 121. The permanent storage circuit 117 also contains two D-type flip-flop circuits. One input of one flip-flop is connected to the line 119 and one input of the other flip-flop is connected to the line 121 for transfer of the function count from the temporary storage circuit 113. The other input of each of the D type flip-flops of the permanent storage circuit 117 is connected to the output of an AND gate 123 which has its inputs connected to the state circuit 107.

When the state circuit 107 is switched into its fourth state of $A\overline{B}$ corresponding to the second address burst 51 of FIG. 3 having been received, the flip-flops of the permanent storage 117 store the counter count presented to it in the lines 119 and 121. Simultaneously with this, a decoder circuit 125 is presented with the function count from output lines 127 and 129 of the permanent storage circuit 117. The decoder converts the binary count in the lines 127 and 129 to a single line function in one of its output lines 131, 133, 135 or 137. Since there are only two lines 127 and 129 which contain the binary function count indicative of the number of pulses in the function burst, only four different functions can be provided. Of course, the temporary storage circuit 113 and the permanent storage circuit 117 can be expanded by adding one or two additional D type flip-flops to each circuit in order to provide additional functions if desired.

The permanent storage circuit 117 maintains the decoder 125 in a particular function state until an $A\overline{B}$ pulse is again received with a different count in the lines 119 and 121 than has been originally stored in the circuit 117. Therefore, one of the four functions that should be provided in the decoder 125 is to turn off any other function that had been previously initiated. The signals in the lines 131–137 may be used to control relays, electronic switches, etc., to perform a variety of switching functions as commanded from some other location along a communication line. As described above, these functions can include those which facilitate testing of the communication line itself. Therefore, a remote testing module may include a tone oscillator for sending a tone back through a communication circuit to the service test center which has commanded the module to do so.

The temporary storage circuit 113 may be purchased commercially from Texas Instruments under their number SN 7474, or may be an equivalent device. The permanent storage circuit 117 is a similar unit. The decoder 125 includes two commercially available circuits, SN 7402 and SN 7417, or equivalents.

It will be understood, of course, that the present digital signaling invention is not limited to the specific details described hereinabove in explaining a specific example but rather that the invention is entitled to protection within the full scope of the appended claims.

We claim:

1. A method of signaling from a controlling location a predetermined switching function at a remote location along a communication circuit having a transmission bandwidth with a voice range of substantially 300 to 3,000 Hz, comprising the steps of:

initially sending a burst of bipolar pulse pairs along the communication circuit to condition any companders along said circuit for receipt of subsequent pulses, pausing a time that exceeds one repetition period of said initial burst of pulse pairs, sending a of burst of a predetermined number of digital bipolar pulse pairs along said communication circuit from the controlling location, said pulse pairs within the burst all having substantially the same duration, serially counting the number of pulse pairs received at the remote location in time sequence as they are received, performing a predetermined switching function according to the number of pulse pairs counted within said of burst.

2. The method according to claim 1 wherein said pulse pair duration is substantially one millisecond.

3. A method of signaling from a controlling location along a communication circuit a programmed function at a selected one of a plurality of remote locations therealong comprising the steps of:

sending a first address burst of a given number of pulses with a given pulse repetition period along the communication circuit from the controlling location to address a particular remote location, said address burst being preceded and followed by a space characterized by an absence of pulses for time equal to at least two pulse repetition periods, counting the number of pulses of the first address burst within the communication circuit at each of the remote locations, detecting said space after the address burst at each of the remote locations, comparing the first address burst pulse count with a preset unique address at each remote location upon detection of said space, thereby to address a single remote location with a burst of address pulses of a number equal to the reset unique address of said single remote location, sending a function burst of a given number of pulses with said given pulse repetition period along said communication circuit from the controlling location to command the addressed remote location to perform a specific function, said function burst being initiated immediately after said space following the address burst and being followed by another space that is characterized by an absence of pulses for a time equal to at least two pulse repetition periods, counting the number of pulses of said function burst within the communication circuit at the addressed location, detecting said space after the function burst at the addressed location, sending a second address burst of pulses along the communication line after the space following the function burst of pulses, said second address burst having the same number of pulses as the first address burst, counting at the addressed location the number of pulses in said second address burst, and causing execution of a unique programmed function at the addressed remote location in response to the number of pulses counted in the second address burst being equal to the preset unique address of the addressed one remote location.

4. The method of claim 3 wherein said communication circuit includes transmission and reception paths with respect to the controlling location and further wherein said programmed function selected by the number of pulses in the function burst loops the transmission path to the reception path at the addressed location whereby the communication circuit can be tested between the controlling and remote locations from the controlling location.

5. The method of claim 3 wherein said programmed function selected by the number of pulses in the function burst connects a test signal generator into the communication circuit at said remote location.

6. The method according to claim 3 wherein the step of causing execution of a unique function includes providing for testing the quality of the communication circuit between the controlling and remote positions.

7. An apparatus for performing an electrical switching function, comprising, means for setting a unique address of said apparatus, means responsive to an input for emitting a space signal when a pulse has not been received at the input for a set period of time, means responsive to a first burst of pulses at the input and responsive to the space signal for developing a match signal when the number of pulses of said burst equals the preset address coincident with an occurrence of said space signal, means responsive to a second burst of pulses at said input, to said match signal and to the space signal for determining which of a plurality of predetermined switching functions is to be performed by the apparatus, and means responsive to a third burst of pulses at said input and to said space signal for executing the selected predetermined switching function.

8. Apparatus according to claim 7 wherein said means responsive to a third burst of pulses executes the predetermined switching function when the number of pulses of the third burst equals the preset address.

9. A switching module for connection to a communication circuit, comprising, input circuits for connection of the switching module to the communication circuit, a binary counter connected to said input circuits in a manner that the counter increments a given fixed amount for each pulse to be detected in the communication circuit, a binary address code setting means, a comparator circuit monitoring the count of said counter circuit and a fixed binary address code from the binary address code setting means, said comparator emitting a mismatch signal at all times except when the counter is at the same value as the fixed binary address code for the module wherein the comparator emits a match signal, a space detector connected to said input circuits and having a first output signal when a burst of pulses is being received by the module and a second output signal at the end of the burst of pulses when there have been no pulses for a fixed period of time, and means receiving the space detector output signal and the comparator output signal for changing among first, second, third, and fourth distinct binary states in response to the second output signal being generated by the space detector circuit, the actual change in state being determined by the state of the device upon receiving the second output signal from the space detector and by whether the output signal of the comparator is in a matched or a mismatched state upon receipt of the second output signal from the space detector, whereby said state changing means moves through its distinct binary states in response to the number of pulses in bursts of pulses occurring between spaces.

10. Apparatus according to claim 9 which additionally comprises a word end detector connected to said input circuits and developing an output signal that resets said binaty state changing means to its first state after a fixed period of time after the end of a burst of pulses, said word end fixed period of time being longer than the fixed period of time that said space detector is set to wait before changing to its second output signal level.

11. Apparatus according to claim 9 wherein said binary state changing means moves from its first state to its second state upon the space detector output changing to its second output signal simultaneously with the comparator emitting a match signal.

12. Apparatus according to claim 11 wherein said binary state changing means moves from its second state to its third state upon the space detector output changing to its second output signal simultaneously with the comparator emitting a mismatch signal.

13. Apparatus according to claim 12 wherein said binary state changing means moves from its third state to its fourth state upon the space detector output changing to its second output signal simultaneously with the comparator emitting a match signal.

14. Apparatus according to claim 13 which additionally comprises:

means connected to said counter for temporarily storing the count thereof when said binary state changing means changes from its second to its third state.

15. Apparatus according to claim 14 which additionally comprises means connected to the temporary storage means for permanently storing the counter value as held in the temporary storage when the binary state changing means changes from its third state to its fourth state.

16. Apparatus according to claim 15 which additionally comprises a decoding logic circuit connected to the permanent storage means for converting the counter count stored therein to a single predetermined switching function.

17. Apparatus according to claim 9 which additionally comprises a delay circuit receiving the output signals of the space detector for resetting the counter to zero a short time after the space detector switches from its first output level to its second output level.

* * * * *